INVENTORS:
C. R. HILPERT
J. B. BLACK

BY: *James E. Nilles*
ATTORNEY

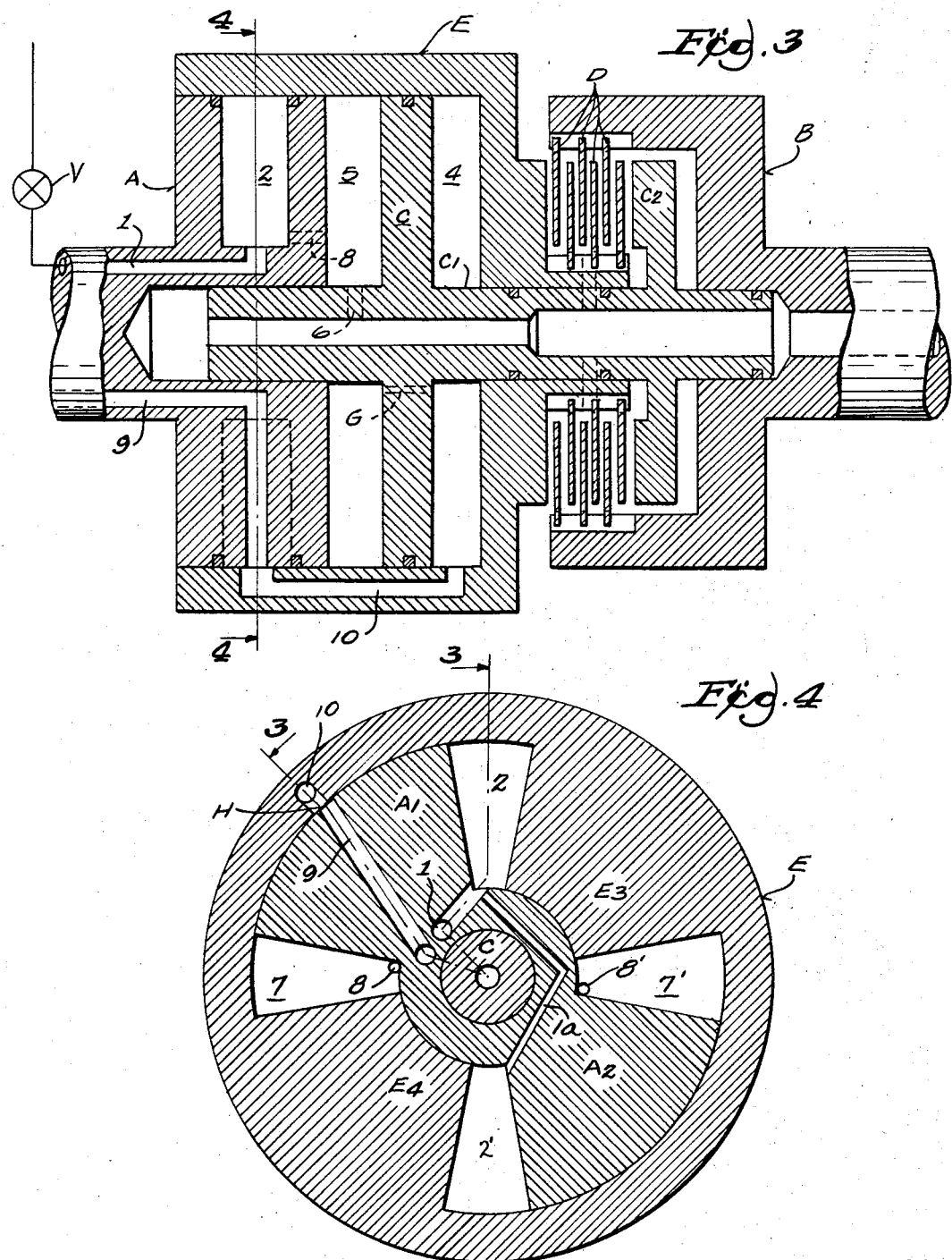

INVENTORS:
C. R. HILPERT
J. B. BLACK

INVENTORS:
C. R. HILPERT
J. B. BLACK

BY: James E. Nilles
ATTORNEY

United States Patent Office 3,403,763
Patented Oct. 1, 1968

3,403,763
POWER TRANSMITTING DEVICE HAVING HYDRAULICALLY ACTUATED FRICTION PLATES AND TORQUE SENSING MEANS
Conrad R. Hilpert, Winnebago, and James B. Black, Roscoe, Ill., assignors to Twin Disc, Incorporated, Racine, Wis., a corporation of Wisconsin
Filed Jan. 16, 1967, Ser. No. 609,457
9 Claims. (Cl. 192—56)

ABSTRACT OF THE DISCLOSURE

Power transmitting devices, such as clutches or brakes including disengageable friction plates, which utilize hydraulic means for sensing torque between the drive and driven members and accordingly actuating the friction clutch to provide a constant output torque.

BACKGROUND OF THE INVENTION

The present invention pertains to hydraulically actuated friction devices, such as clutches or brakes, which have hydraulic means for sensing the torque between the drive and driven members of a power transmitting mechanism, and which means actuates the disengageable clutch or brake to insure a constant output torque of the mechanism.

This invention is related generally to the co-pending U.S. application assigned to an assignee common with the present application, U.S. Ser. No. 555,460, filed June 6, 1966, which issued on Dec. 26, 1967, as U.S. Patent No. 3,360,087, entitled "Hydraulically Actuated Friction Clutch Having Torque Control Means." The said co-pending application Ser. No. 555,460 discloses mechanical means, for example, cam and balls, for sensing the torque between the drive and driven members and consequently causing variable clamp-up of the friction plates to maintain constant output torque.

In prior art devices of this general character, the coefficient of friction of the clutch surfaces changes considerably during operation of the device, and as a result the load may be subjected to a different torque than originally intended or desired.

SUMMARY OF THE INVENTION

The present invention provides a power transmitting device, such as a clutch or brake, having hydraulically actuated friction plates which are capable of being clamped up in a variable amount, and also having hydraulic means for sensing the torque between the drive and driven members and accordingly varying the friction plate clamp up force to consequently regulate or maintain constant the output torque of the device.

A more specific aspect of the invention relates to a device of the above type which utilizes a rotary cylinder and piston for the sensing means.

Yet another aspect relates to such a device in which the friction plate apply pressure is separate from the control pressure and as a result the transmitted torque will be a function of the control pressure and readily adjustable.

Another aspect of the present invention relates to devices of the above type which are capable of transmitting torque in either direction and with the same degree of control.

These and other objects and advantages of the present invention will appear as this disclosure progresses.

BRIEF DESCRIPTION OF THE DRAWING

FIGURE 3 is a view similar to FIGURE 1, but illustrating a two pressure system, that is, having separate control and apply pressure;

FIGURE 4 is a cross sectional view taken generally along line 4—4 in FIGURE 3;

DESCRIPTION OF THE PREFERRED EMBODIMENTS

The drawings are schematic in character and the devices would, in practice, be fabricated from different, separate parts to facilitate manufacture and assembly rather than being made integral as shown. Furthermore suitable oil seals and bearings of conventional nature would be provided, some of which have only been indicated schematically and not referred to otherwise. In addition, conventional passages would be provided for distribution of cooling medium, such as oil, to the interleaved friction plates.

The members referred to by reference letters A and B are the drive and driven members of the power transmitting device and either can be considered the drive or driven member, that is power can flow through the device in either direction, unless indicated otherwise. By drive member is meant it is the input member, that is, power is put into the device through the input or drive member. By driven member is meant it is the power output member.

Also in general reference to the drawings, a fluid pressure medium, such as oil is provided from a conventional pressure source or sources, having conventional control valves, which are not believed necessary to illustrate herein, it being sufficient to state that the pressure fluid is introduced into the device via conventional rifle drilling or other passages, as indicated.

Interleaved friction plates D are shown in the various figures and are alternately splined to their associated members in conventional manner and are axially slidable within limits so as to be capable of being clamped up tightly to transmit full torque, or clamped with a variable force to thereby transmit a proportional portion of the power, as is known. Complete release of the clamp up pressure causes disengagement of the drive connection, conventional springs (not shown) sometimes being used to insure clean release.

Furthermore, as a general note, the clutches shown may be arranged in duplex fashion as shown, for example in the U.S. patent to Snoy et al., No. 3,243,026 issued Mar. 29, 1966, but for the sake of clarity of the disclosure, reference will be made to single power transmitting devices.

While reference may be made for convenience herein to a clutch wherein the invention finds considerable utility, it will be appreciated by those skilled in this art that the invention is equally applicable where one member may be fixed, as in a brake.

Figure 1:
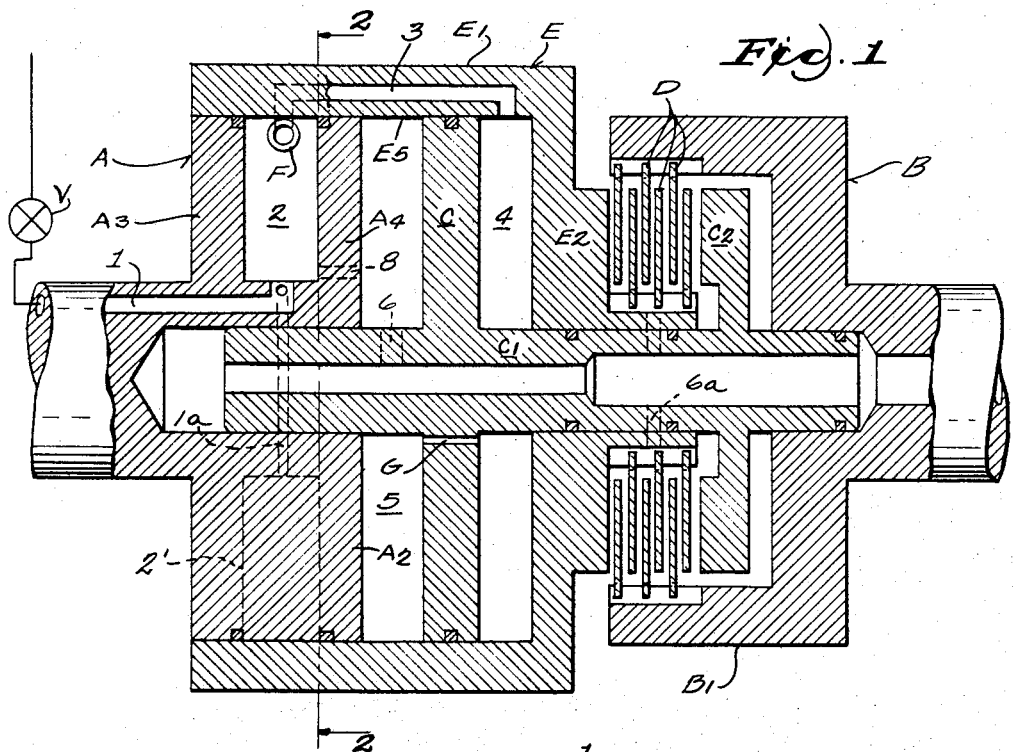
FIGURE 1 is a longitudinal, cross sectional view of a power transmitting device embodying the present invention, and illustrating a single pressure system.
Figure 2:
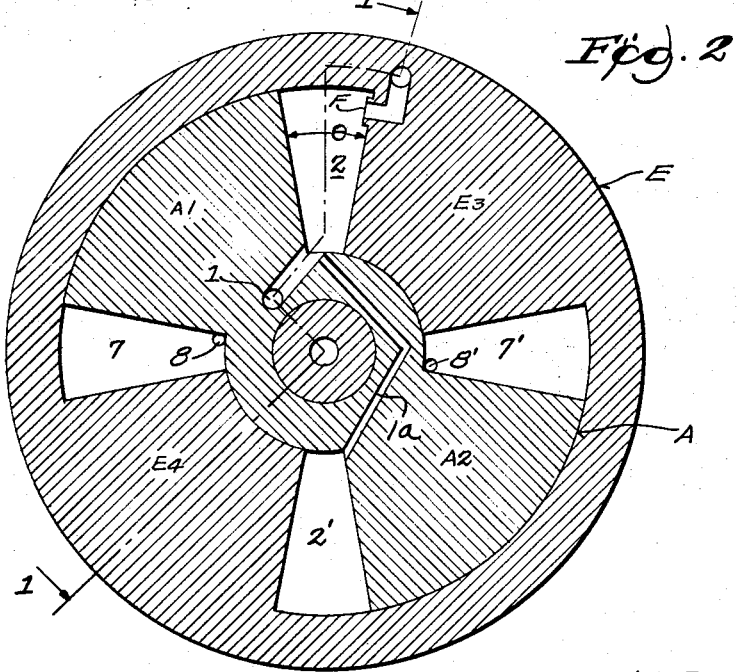
FIGURE 2 is a cross sectional view taken generally along line 2—2 in FIGURE 1.

Referring now in greater detail to the drawings, and in particular FIGURES 1 and 2, power from a source not shown may be applied to the member A. Member A is fabricated to define diametrically opposed, portions A1 and A2, and also having end flanges A3 and A4. Pressure fluid is supplied for controlling the clutch apply pressure, from an external control valve means V, via passage 1 in member A which terminates in the expansible chamber 2 (FIGURE 2), to be referred to momentarily.

Member E is a sensing or carrier member and serves to carry some of the friction plates, as previously described, and can bear in abutting, clamp-up relationship to the plates. It is shown for illustrating the invention as being formed as a generally annular housing having an outer cylindrical portion E1, a plate carrying and abutting flange E2, and diametrically spaced, inwardly extending portions E3 and E4.

Thus, members A and E form four expansible chambers 2, 2', 7 and 7' between them, into and from which fluid is introduced and dumped as will appear. Ports 8 and 8' provide vents for chambers 7 and 7'.

A piston C, slidable by its central stem C1 in complementary central bores in members A, E and B, is enclosed by and in sliding sealing engagement with the internal cylindrical surface E5 of member E. Piston C has a friction plate back-up plate or radial flange C2 which can abut against one end of plates D, opposite to flange E2.

Member B has some of the plates D splined thereto, as previously mentioned, and is shown as having a cylindrical portion B1 which surrounds plates D and back-up flange C2.

As previously mentioned, fluid supply passage 1 is in fluid communication with chamber 2 which in turn communicates with chamber 2' via passage 1a formed in member A. As as result clutch control pressure fluid can flow into rotary piston chambers 2 and 2' and the resulting pressure therein causes their expansion and relative rotation between members A and E, that is, the angle θ (FIGURE 2) between the radial walls or portions of members A and E increases.

A passage 3 formed in member E, as is a valve seat F, and passage 3 places chamber 2 in fluid communication with the expansible chamber 4 defined by piston C and member E. Thereby, pressure fluid entering chamber 4 causes its expansion and consequent shifting of the piston C to the left (as viewed in the drawing), resulting in clutch plate clamp-up.

Assume the power source drives member A and a load (not shown) attached to B. If the torque applied is such that it causes a decrease in angle θ, the pressure in chambers 2 and 2' will be overcome. That is to say, if a greater torque is applied than the pressure in chmabers 2 and 2' is capable of supporting, chambers 2 and 2' will contract, closing valve F and stopping flow of fluid to the clutch engaging chamber 4. Pressure fluid in chamber 4 is continuously bled to the sump (not shown) via orifice G and the balance piston chamber 5, passage 6 in the stem of piston C and the conventional clutch cooling system 6a. As a result the clamp-up force on the clutch plate drops, reducing the capability to develop torque.

The relationship between the torque developed by the friction plates D and the torque developed by the pressure fluid in chambers 2 and 2' results in a regulating action across valve F so that only sufficient pressure is permitted in chamber 4 to precisely develop the plate torque corresponding to that torque of the pressure fluid in chambers 2 and 2'.

As a result, variations of coefficient of friction in the plates cause the pressure in the clutch actuating chamber 4 to vary, but the transmitted or output torque remains constant and corresponding to the torque developed by the pressure in chambers 2 and 2'.

With the above arrangement, the pressure fluid actuating the clutch is a direct function of the torque; if there is no torque, the angle θ increases. If the torque is greater than the pressure of the fluid, the valve F closes thus reducing the carrying ability of the clutch.

The result is to measure the torque with a rotary cylinder piston and then use the results of that measurement to engage or disengage the clutch accordingly to provide the output torque desired.

Chambers 7 and 7' are vented to the sump via ports 8, 6 and the cooling system designated generally at 6a. Therefore no back pressure will be developed to inhibit the action of pressure in chambers 2 and 2'. However the fluid in chambers 7 and 7' will effectively nullify the effect of centrifugal pressure in chambers 2 and 2'. Similarly, fluid in balance chamber 5 balances the centrifugal head developed by the fluid in actuating chamber 4.

The above single pressure system is useful where at the lowest possible coefficient of friction, the required pressure in chamber 4 is less than the available pressure in chambers 2 and 2'. That is to say, the clutch apply pressure can never be greater than the control pressure because of the series connection where the control pressure also feeds the clutch actuating chamber.

FIGURES 3 and 4

The device shown in these figures illustrates the use of the present invention in a two pressure system, that is, where the pressure used to apply clamp up force to the plates is separate from the pressure fluid used to sense or control the torque. Here the clutch apply pressure could be greater than the control pressure and fluid is supplied from a continuous, high pressure, external source.

The arrangement in FIGURES 3 and 4 is somewhat similar to that in FIGURES 1 and 2 except that high pressure fluid for actuating chamber 4 to apply clutch clamp-up force is continuously introduced via a separate passage 9 in member A and passage 10 in member E. This high pressure fluid flow is regulated by valve H (FIGURE 4) formed by members A and E where the passages 9 and 10 join. Control pressure, through external valve means V, is applied by passage 1 as in FIGURE 1.

With this arrangement, the maximum available pressure for the actuating chmaber 4 is not dependent on the control pressure in passage 1, and the output torque is readily adjustable.

The above described devices of FIGURES 1 to 4 are for use when transmitting torque in only one direction of rotation.

Figure 5:
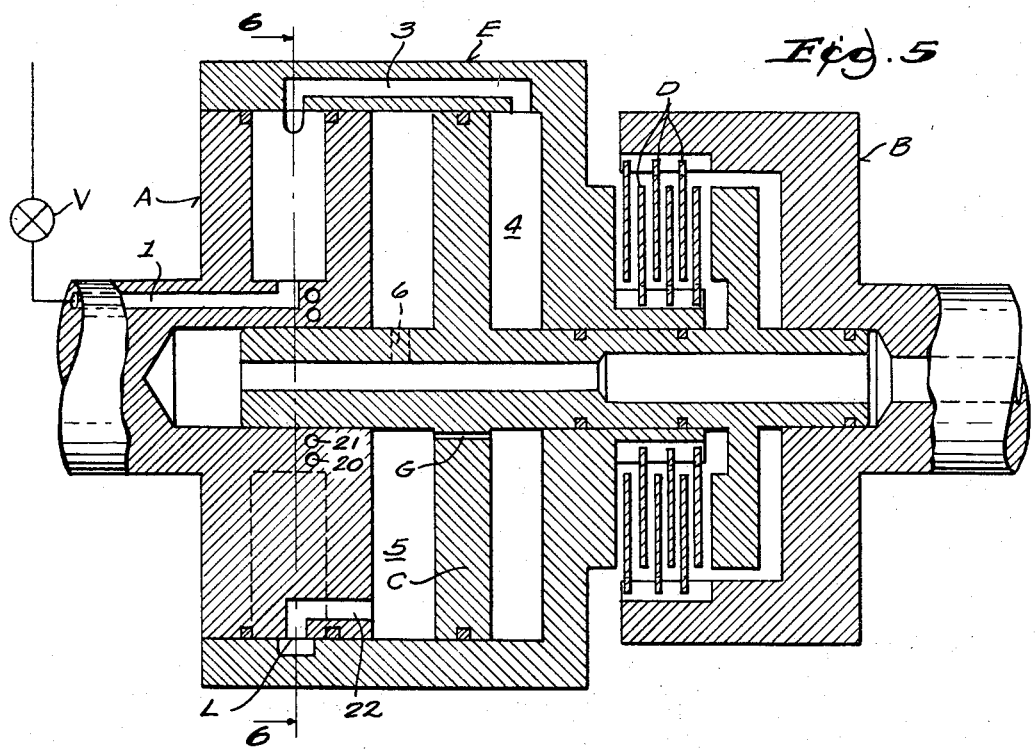
FIGURE 5 is a view similar to FIGURE 1 but showing the single pressure system incorporating means for controlling the torque transmitted in either rotational direction through the device.
Figure 6:
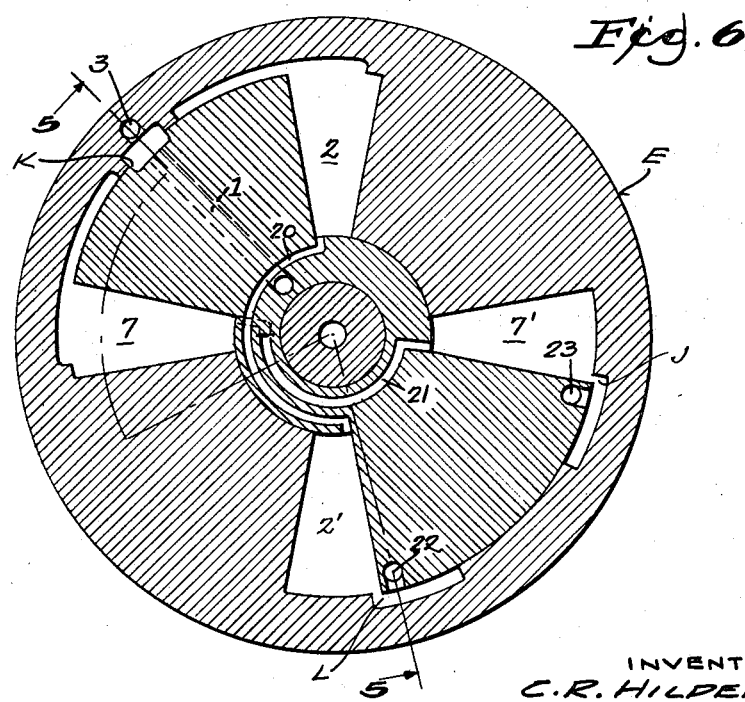
FIGURE 6 is a cross sectional view taken generally along line 6—6 in FIGURE 5.

FIGURES 5 and 6

This embodiment is a single pressure system, as in the FIGURES 1 and 2 device, wherein both the control pressure and apply pressure are provided via valve V to passage 1, and in addition it also incorporates certain valving for transmitting torque in either direction of rotation. To do this, provision is made for measuring the pressure or torque in chambers 7 and 7' as well as in chambers 2 and 2'.

The valving port K serves to transfer the fluid pressure in passage 1 to either chamber 2 and 2' or to chambers 7 and 7', to thereby oppose either direction of developed torque. Valving port K also serves to vary the pressure to the clutch actuating chamber 4 via passage 3, to thereby limit the torque to that which the pressure at passage 1 is capable of developing.

Chambers 2 and 2' are connected together via passage 20 in member A. Valve port L, when open, connects chambers 2 and 2' to the sump via passage 22, chamber 5 and port 6.

Chambers 7 and 7' are connected together via passage 21. Valving port J, when open, connects chambers 7 and 7' via passage 23 to the chamber 5 and port 6 consequently to the sump.

Thus the control pressure is switched to chambers 2 and 2' or chambers 7 and 7' whereby the clutch is sensitive to either right or left hand torques. This is accomplished by relative rotation between member A and member E. As shown in FIGURE 6, pressure in passage 1 will apply the clutch directly via passage 3. As the clutch begins to engage and transmit torque, member A will be rotated relative to member E, causing fluid pressure to be valved at K, to chamber 2, or chamber 7 depending upon the direction of the torque. Assuming the direction is such that the opening at valve K is such that pressure is admitted from passage 1 to passage 3 to chamber 2, pressure will also be admitted to chamber 2' via the connecting passage 20.

As the torque capacity of the clutch is increased, the relative movement of member A to member E will increase. This increased movement will cause passage 1 to be gradually closed at K in its connection to passage 3. The pressure at passage 1 is now fully connected to chambers 2 and 2', the connection between chamber 2' and passage 22 at L being closed. When the torque of the clutch exceeds the forces of the pressure from passage 1 at chamber 2 and chamber 2', the connection between passage 1 and passage 3 will be completely shut off by valving action at K. This will cause the pressure on clutch plates to decrease because the shutting off of pressure from passage 1 to passage 3 will cause the pressure at chamber 4 to decrease. As the torque of the clutch decreases, the pressure from passage 1 in chambers 2 and 2' will cause an opposite relative movement of member A to member E, opening the passage 1 to 3, and re-establishing the torque. The torque of the clutch will then limit itself to exactly equal the reaction of the forces at chamber 2 and chamber 2', generated by the control pressure in passage 1.

If the torques transmitted are opposite in direction, the exact sequence of events will be followed but the active pressures will be of course in chambers 7 and 7'

Figure 7:
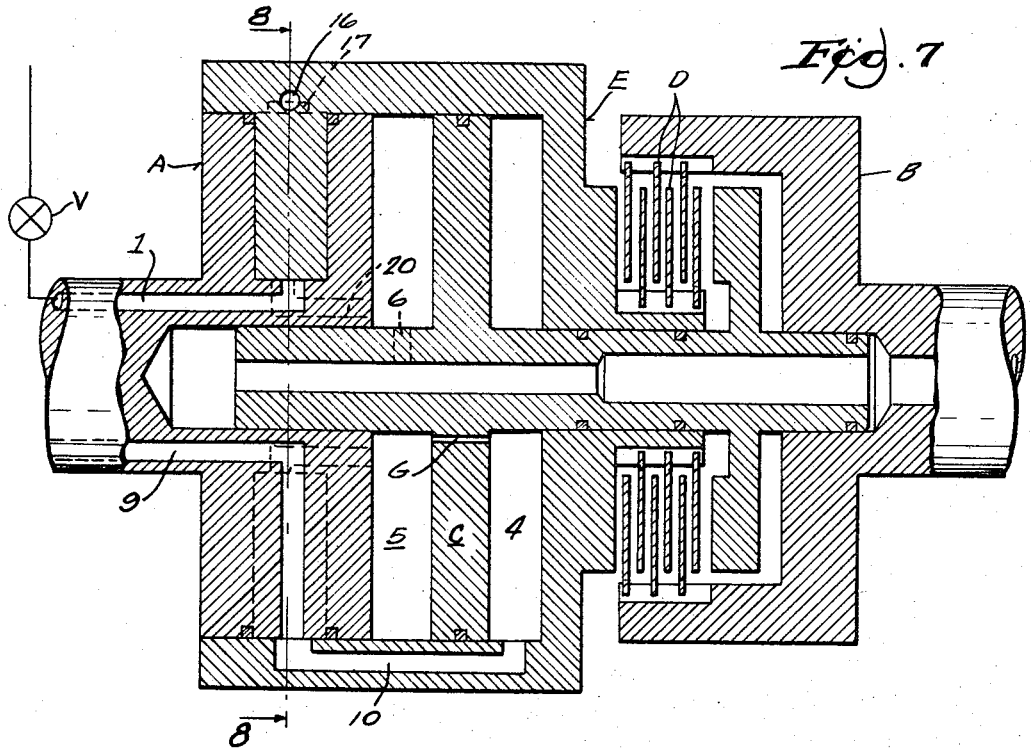
FIGURE 7 is a view similar to FIGURE 3 but showing the two pressure system embodying the bi-directional torque control means.
Figure 8:
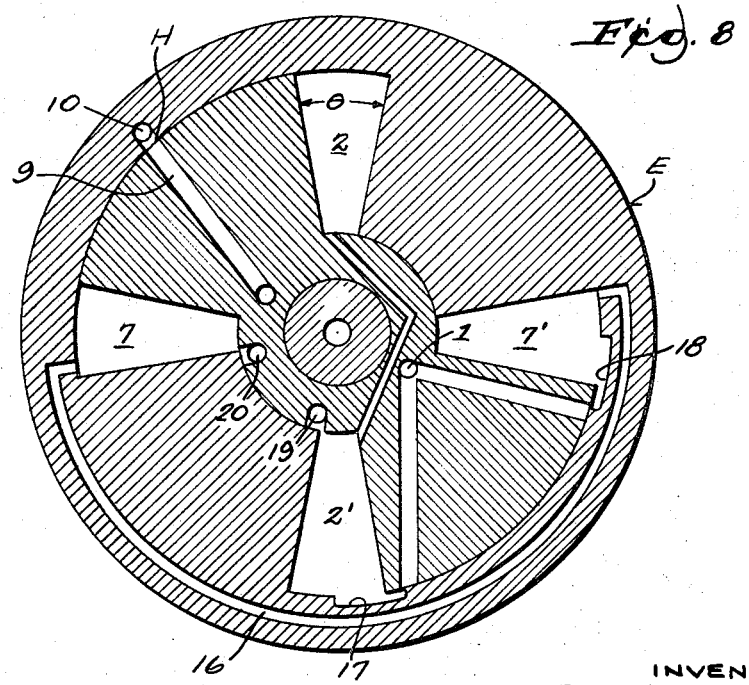
FIGURE 8 is a cross sectional view taken generally along line 8—8 in FIGURE 7.

FIGURES 7 and 8

This shows a two pressure system, as in FIGURES 3 and 4, that also includes the bi-directional (that is left or right hand rotation) torque control.

Passage 16 connects chambers 7 and 7'. Ports 19 and 20 connect chambers 2' and 7 respectively, to the sump via chamber 5.

Control pressure from valve V to passage 1 can go to chambers 2 and 2' or to 7 and 7'.

Apply pressure is furnished via passage 9 to passage 10, through the valve H formed therebetween.

Passages 17 and 18 permit the control pressure from passage 1 to be selectively diverted to chambers 2 and 2' or to 7 and 7', respectively.

As in the device of FIGURES 5 and 6, the control pressure is switched to either set of chambers 2 and 2' or 7 and 7' thereby permitting the device to be sensitive to torque in either rotational direction, in the same manner as described above in connection with FIGURES 5 and 6.

We claim:

1. A power transmitting device of the type having a drive and a driven member, hydraulically actuated friction plates, and hydraulic means for varying the degree of engagement of said plates, the improvement comprising, externally controlled hydraulically actuated means between said drive and driven members for sensing the magnitude of the torque therebetween and including valve means for regulating the flow of pressure fluid to said hydraulic means for supplying pressure fluid to said actuating chamber in accordance with the torque sensed and consequently provide constant output torque, and external control valve means connected to regulate the flow of fluid to said hydraulically actuated means.

2. A device as defined in claim 1 including a separate fluid passage means to said hydraulic means.

3. A device as set forth in claim 1 including valve means for regulating flow to said hydraulic means for either rotational direction of torque transmission.

4. A device as set forth in claim 2 including valve means for regulating flow to said hydraulic means for either rotational direction of torque transmission.

5. A hydraulically actuated power transmitting device having input and output members, a carrier rotatably mounted on one of said members and defining torque sensing means including an externally controlled fluid chamber therebetween for sensing the magnitude of the torque by relative rotation therebetween, and external control valve means connected to regulate the flow of fluid to said hydraulically actuated means, interleaved friction plates between the other member and said carrier and forming a disengageable friction plate connection therebetween, an axially shiftable and hydraulically actuated piston mounted for axial shifting relative to said carrier and abuttable against said plates to cause clamp-up of said plates; said piston and carrier defining an expansible fluid, friction plate actuating chamber, passage means for applying pressure fluid to said actuating chamber to cause expansion thereof and consequent axial shifting of said piston and clamp-up of said plates, said torque sensing means including valve means actuated by rotational shifting of said carrier relative to said one member to regulate flow of pressure fluid to said actuating chamber.

6. A device as defined in claim 5 further characterized in that a single pressure fluid supply is provided for both said torque sensing fluid chamber and said actuating chamber.

7. A device as defined in claim 5 further characterized in that separate fluid supply passages are provided for the torque sensing fluid chamber and said actuating chamber whereby the torque output of said device can be independently varied by varying the fluid pressure in said torque sensing fluid chamber.

8. A device as set forth in claim 5 including valve means for regulating flow to said hydraulic means for either rotational direction of torque transmission.

9. A device as set forth in claim 7 including valve means for regulating flow to said hydraulic means for either rotational direction of torque transmission.

References Cited

UNITED STATES PATENTS

| | | | |
|---|---|---|---|
| 2,277,554 | 3/1942 | McCoy | 192—88 |
| 2,521,117 | 9/1950 | DuBois et al. | 192—85 |
| 2,642,971 | 6/1953 | Hagenbook | 192—56 |
| 2,783,628 | 3/1957 | Hallewell | 192—56 |
| 3,182,777 | 5/1965 | Browning et al. | 192—56 |

BENJAMIN W. WYCHE III, *Primary Examiner.*

L. J. PAYNE, *Assistant Examiner.*